Feb. 19, 1957  J. F. HYSLER  2,782,322
LOAD DIVISION SYSTEM FOR POWER TRANSMISSION
Filed July 21, 1951
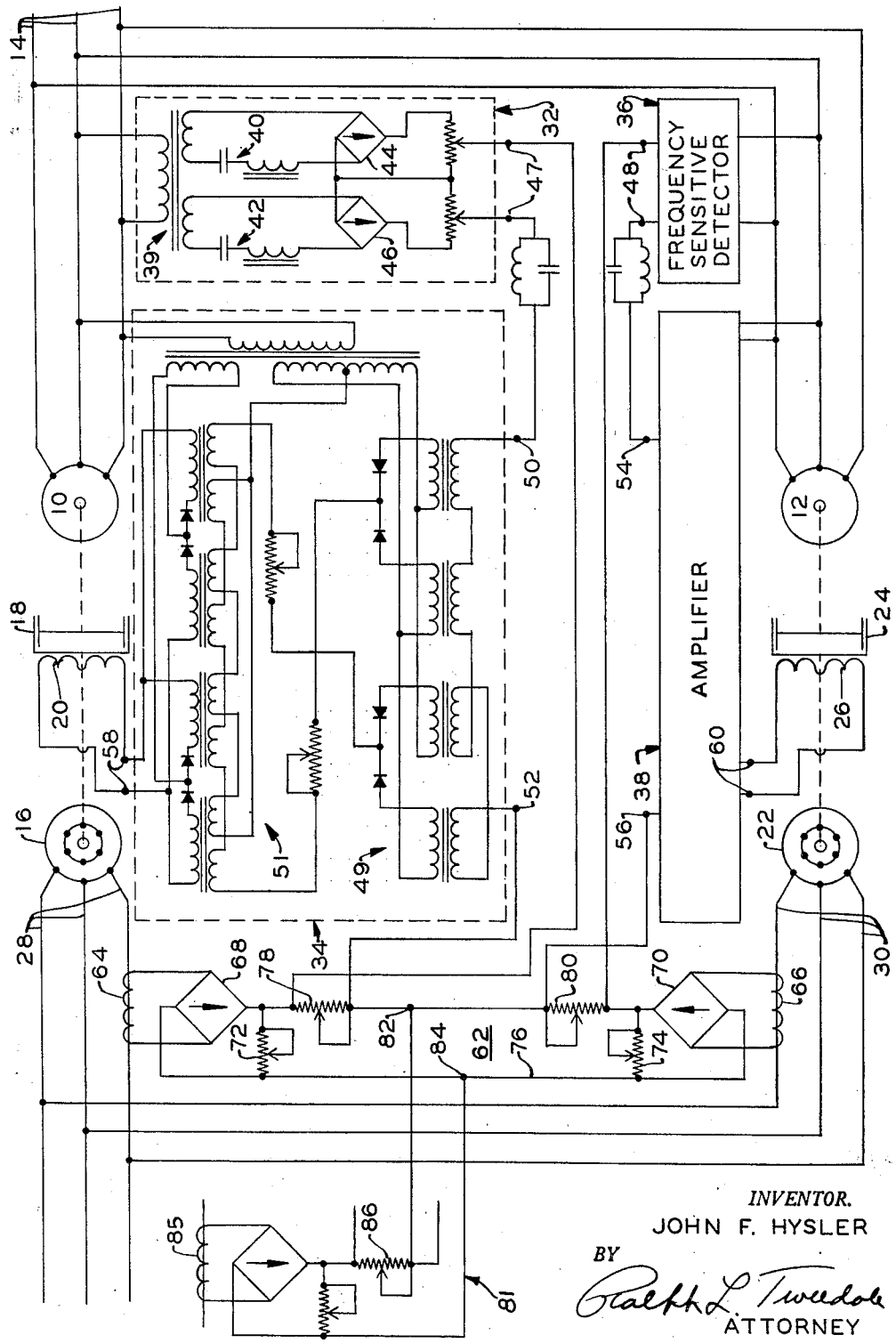
INVENTOR.
JOHN F. HYSLER
BY
Ralph L. Tweedale
ATTORNEY United States Patent Office 2,782,322
Patented Feb. 19, 1957

2,782,322

LOAD DIVISION SYSTEM FOR POWER TRANSMISSION

John F. Hysler, Webster Groves, Mo., assignor to Vickers Incorporated, Detroit, Mich., a corporation of Michigan Application July 21, 1951, Serial No. 237,883

16 Claims. (Cl. 307—57)

This invention relates to power transmission, and more particularly to parallel operated generator systems.

In the general case of parallel operated alternating current generators having associated individual prime movers, a fair load division between the alternators is maintained by the drooping speed-load characteristics of the prime movers. Any tendency of one generator to take more than its proper share of the load results in reactions in the system which oppose this tendency. If the speed-load characteristics of the prime movers were flat, parallel operation of the alternators would be unstable to such a degree that small disturbances would cause large undesirable changes in the load delivered by each alternator and also of the ratio of load division. Any tendency of one generator to take more than its fair share of the load would not be opposed by the system.

An example of an alternating current generator system with a mechanical input having a substantially flat or zero droop speed-load characteristic is an alternator coupled to an electric motor through a slip coupling controlled or "supervised" by an efficient speed or frequency detector in the generator output circuit. Sensitive frequency (speed) regulated systems employing electrically controlled slip couplings can be so tightly regulated that their mechanical input will approximate a zero speed-load droop.

The present invention contemplates forced load division of a desired ratio between speed regulated parallel operated alternating current generators by obtaining electrical signals which are a function of the differential between the power outputs of the respective generators, and applying the signal in conjunction with a speed regulating signal to the electrical controls of the mechanical power applied to the input of the respective generators.

It is therefore an object of this invention to provide means for forcing a desired load division between a plurality of parallel operated generators.

A further object of the invention is to provide an alternating current generator system wherein desired load division is automatically forced between a plurality of parallel operated generators.

Another object is to provide a system of a plurality of parallel operated alternating current generators wherein the net effect of two electric signals, a speed or frequency responsive signal and differential load ratio responsive signal, is utilized to control the mechanical input to a generator.

Further objects and advantages of the present invention will be apparent from the following description, reference being had to the accompanying single figure drawing which is a diagrammatic illustration of a preferred form of the present invention.

Referring now to the drawing, two generator systems are shown having, respectively, generators 10 and 12 with their outputs connected in parallel to load lines 14. Since each generator system is provided with similar driving and regulating apparatus, only that associated with generator 10 is shown and described in complete detail, while portions of the apparatus relating to generator 12 are shown in block form. In order to simplify the diagram and description, the various circuit breakers and switches normally required for practical operation are not shown. For the same reason the field current regulation circuits of the generators are not shown.

Generally, in each system the generator is driven by a prime mover through an electrically controlled slip coupling energized by signals which are functions of both the speed or frequency of the generator and the difference between the real kilowatt loads of the two generators. In the preferred embodiment of the invention the differential load signal is derived from the power currents of electric motors functioning as the prime movers of the generators.

Generator 10 is driven by an electric motor 16, for example, an induction motor, through a suitable controllable slip coupling 18, for example, a magnetic particle slip clutch, provided with an exciting winding 20. Correspondingly, motive power is furnished to generator 12 by an electric motor 22 through an electrically controlled slip coupling 24 excited by a winding 26. Each of the motors is energized through input leads 28 and 30 respectively connected to a power source (not shown).

Generally, it is characteristic of a generator prime mover to change speed upon change in generator load. For example, upon generator load increase the prime mover tends to slow down to draw more power in order to furnish more power to the generator. In the case of alternating current generators, changes in speed cannot be tolerated because of the consequent output frequency variations. In order to maintain frequency, a constant generator speed must be maintained. Where wide variations can be tolerated this is done by manually changing the input power applied to the generator. Where tight regulation is desired this is accomplished by automatic power control to the generator input in response to changes in generator speed.

Induction motors up to rated load are considered substantially constant speed. However, variations in supply voltage and frequency will cause poor regulation of the motor speed. In the apparatus shown, tight speed regulation is provided by a component of excitation furnished to the slip coupling by the amplified output of a speed or frequency detector. The supervision of the detector permits the slip coupling to absorb the frequency and voltage fluctuations of the motor supply source as well as regulate the generator speed against load changes. Since a magnetic particle slip coupling has substantially constant torque output for a given value of excitation, changes of excitation provide different values of power input to the generators.

The detector and amplifier for generator 10 are shown at 32 and 34 while the corresponding apparatus associated with generator 12 is indicated at 36 and 38. Generator speed is directly related to output frequency which may be termed the electrical speed. Consequently, a generator speed detector is a frequency detector and vice versa. The detector 32 is coupled through a transformer 39 to the generator output and is a frequency sensitive network employing a pair of series resonant circuits 40 and 42, one resonant to a frequency above and the other to a frequency below the desired generator output frequency. For example, if the regulated frequency is 400 cycles, circuit 40 may be 385 cycles and circuit 42 may be 415 cycles. Rectifiers 44 and 46 rectify the outputs of the respective resonant circuits 40 and 42. The output 47 of the detector 32 is the differential between the rectified outputs of resonant circuits 40 and 42, and the amplitude and polarity of the output current at 47 will be determined by the direction and degree of generator output frequency deviation from the desired frequency. The corresponding output of detector 36 is indicated at 48.

Although any suitable amplifier may be used, the two-stage magnetic amplifier 34 shown is admirably suited for the purpose. The first stage 49 is a push-pull reversible polarity magnetic amplifier feeding into a magnetic amplifier 51 (second stage) with a unidirectional output coupled to the control winding of the slip coupling. The input terminals of amplifier 34 are indicated at 50 and 52 while the corresponding input terminals of amplifier 38 are at 54 and 56. Both amplifiers are provided with corresponding output terminals 58 and 60, respectively.

In order to force desired load division between the generators, the slip couplings of the respective generators are provided with an excitation component which is a function of the difference between the real loads of the respective generators. This excitation component is applied to control the power inputs to the generators in opposite sense, i. e., in the case of two parallel generators, this signal acts to decrease the power input of the generator which tends to take more than its fair share of the load, while increasing the power input to the other generator. Where more than two generators are operated in parallel, this signal will act to decrease the input power to the generator or generators that are tending to take more than a fair share of the load while increasing the power input to the generator or generators which are dropping a fair share of the load.

In the preferred embodiment of the invention the differential load signals are derived from the input currents of the respective motors 16 and 22 through a differential network 62 supplied through current transformers 64 and 66 in the input leads of the motors. Motor power current is a substantial component of motor input current. To provide the convenience of direct current, rectifiers 68 and 70 are connected across the secondaries of the current transformers. Adjustable resistors 72 and 74 are shunted across the outputs of the respective rectifiers 68 and 70 to provide initial adjustment and a finite safe load on the current transformers. A direct current signal varying with motor current is developed across each resistor 72 and 74.

The outputs of the rectifiers 68 and 70 are connected in series opposition by a conductor 76 and through adjustable load division signal resistors 78 and 80. The resistors 72 and 74 are adjusted so that no current flows through resistors 78 and 80 when the generators are dividing the real load in the desired ratio. Since motor power current is a function of the real kilowatt load on its associated generator, a change in load division will cause a differential current to flow through the resistors 78 and 80 in a direction depending on which generator is taking more than its fair share of the load. A signal voltage proportional to the current therethrough is developed across the resistors 78 and 80 and each furnishes an excitation component to its associated slip coupling, the connections across 78 and 80 being so poled that the excitation of the respective slip couplings is affected in opposite sense.

Since the speed regulating signal and the differential load signal are applied to the exciting windings of the slip couplings, it is more practical to combine the signals by connecting the signal circuits in series and amplify the resultant signal (sum or difference as case may be) in the same amplifier, and then apply the amplifier output to the excitation winding of the slip coupling. This is accomplished in the disclosed apparatus by connecting one of the input terminals of the amplifier 34 and one of the output terminals of the detector 32 across the resistor 78, and connecting the other input terminal of the amplifier with the other output terminal of the detector, corresponding connections being made between the resistor 80 and the amplifier 38 and detector 36.

The connections should be so related with respect to polarities that an increase in generator frequency will cause the output of the associated frequency detector to assume a polarity such that the amplifier output will change the slip coupling excitation so as to introduce compensating slip, and conversely to reduce the slip in case of a decrease in generator frequency. With respect to the connections to the differential load sensitive network they should be so related that when one generator takes more than the desired share of real load, the amplified signal from the associated load division signal resistor (78 or 80) will change the slip coupling excitation to increase the slip and reduce the power input to that generator, and act in the reverse manner on the associated apparatus of the other generator. It will be appreciated that when the only deviation is either of frequency or of real load division ratio, then only one signal operates on the input power control of the generator through the slip coupling excitation, either the frequency responsive signal or the load differential responsive signal. However, if both frequency and load division deviate from the desired values, then the net effect on the slip coupling excitation is due to the resultant of the frequency signal and the load differential signal.

Regardless of the number of generators operated in parallel the respective rectified outputs of the current transformers in the input leads of the respective motors are all connected across the points 82 and 84 through their associated load division signal resistors to form a differential network, the leads of the same polarity from the rectifiers being connected to a common terminal, i. e., in opposition. For example, if three generators are operated in parallel, the part of the load division network associated with the third generator, shown generally at 81, is connected to points 82 and 84 as shown in the drawing. Although the third generator and motor are not shown, the current transformer in the input lead of the third motor is indicated at 85, while the differential load division signal resistor associated with the third generator is shown at 86. The signal across resistor 86 is combined with the frequency signal and applied to the amplifier and slip coupling (both not shown) associated with the third generator (not shown) in the same manner as shown for generators 10 and 12. The load division signal resistor associated with each system develops a load division signal voltage which is a function of the deviation of the load carried by the generator of the system from the desired proportion of the total load carried by all the generators.

Although the heretofore described manner of operation utilizes reversible polarity signals, both the frequency detector and the load division ratio network can be adjusted or biased so that their outputs never change polarity, and deviations from desired norms are reflected only in amplitude changes above and below a reference or bias point.

While the form of embodiment of the invention as herein disclosed constitutes a preferred form, it is to be understood that other forms might be adopted, all coming within the scope of the claims which follow.

What is claimed is as follows:

1. A plurality of generator system, each having a generator, a slip coupling with a slip control operable in response to signals, and motor means for driving the generator through the slip coupling, said generators being connected in parallel to supply a load, means in each system for producing a load signal indicative of the output load of the generator in the system, a static impedance network for differentially combining the load signals of the respective generators and for producing from said combined signals a separate load division signal for each system, said load division signal for any given system being a function of the direction and degree of deviation of the load carried by the generator of the system from a desired proportion of the total load carried by all the generators, and means for applying the load division signal for a system to the slip control of the system to force the generator of the system to assume only a desired proportion of the total load carried by all the generators.

2. A load circuit, a plurality of generator systems, each having a generator, magnetic amplifier means, a slip coupling with a slip control operable in response to the output of said magnetic amplifier means, and motor means for driving the generator through the slip coupling, said generators being connected in parallel to said load circuit, means in each system for producing a load signal indicative of the output load of the generator in the system, means for differentially combining the load signals of the respective generators to produce a separate load division signal for each system, means in each system for producing a speed signal indicative of the generator speed of the system, and means for controlling the magnetic amplifier of a system with the resultant of the speed and load division signals of that system.

3. A plurality of systems, each including a generator, a controllable slip coupling, and prime moving means for driving the generator through said slip coupling, said generators being connected in parallel to supply a load, and control means for applying to the slip coupling of each system a resultant control force having a load division component which is a function of the load division between the respective generators and a speed component which is a function of the generator speed in that system.

4. A plurality of generator systems, each including a generator, a slip coupling with a slip control operable in response to signals, and a motor for driving the generator through the slip coupling, said generators being connected in parallel to supply a load, means in each system for producing a load signal indicative of the load on the generator of that system, static means for differentially combining the load signals of the respective systems and for producing from said combined load signals a separate load division signal for each system which is a function of the direction and degree of deviation of the system from a desired load division between the systems, means in each system for producing a speed signal responsive to the generator speed of the system, and means associated with each system for combining the load division signal of the system with the speed signal of the system to produce a resultant control signal for the slip control of the system to regulate the generator speed and to regulate the load carried by the generator of the system to a desired proportion of the total load carried by all the generators.

5. A plurality of alternating current generator systems, each including a generator, a slip coupling with a slip control operable in response to signals, and a motor for driving the generator through the slip coupling, said generators being connected in parallel to supply a load, means in each system for producing a load signal indicative of the real load on the generator of that system, static means including an impedance network for differentially combining the load signals of the respective systems and for producing from said combined signals a separate load division signal for each system which is a function of the direction and degree of deviation of the system from a desired load division between the systems, means in each system for producing a speed signal responsive to the generator speed of the system, and means including magnetic amplifier means associated with each system for combining the load division signal of the system with speed signal of the system to produce a resultant control signal for the slip control of the system to regulate the generator speed and to regulate the load carried by the generator of the system to a desired proportion of the total load carried by all the generators.

6. A plurality of generator systems, each including a generator, a slip coupling with slip control responsive to electric signals, and an electric motor for driving the generator through the slip coupling, the generators being connected in parallel to supply a load, means in each system for deriving from the motor current a current which is a function of the load carried by the generator of the system, static means including an impedance network for differentially combining said derived currents of the respective systems to produce differential current which is a function of the deviation from a desired load division between the generators and for deriving from said differential current separate load division electric signals for each system, the load division signal for each system being a function of the degree and direction of deviation of the load carried by the generator from a desired proportion of the total load carried by all the generators, and means for applying to the slip control of each system the load division signal for the system.

7. A plurality of alternating current generator systems, each including a generator, a slip coupling with slip control responsive to electric signals, and motor means for driving the generator through the slip coupling, the generators being connected in parallel to supply a load, means in each system for deriving a current which is a function of the true load carried by the generator of the system, static means including an impedance network for differentially combining said derived currents of the respective systems to produce differential current which is a function of the deviation from a desired load division between the generators and for deriving from said differential current separate load division electric signals for each system, the load division signal for each system being a function of the degree and direction of deviation of the load carried by the generator from a desired proportion of the total load carried by all the generators, and means for applying to the slip control of each system the load division signal for the system.

8. A plurality of alternating current generator systems, each including a generator, a slip coupling with slip control responsive to electric signals, and motor means for driving the generator through the slip coupling, the generators being connected in parallel to supply a load, means in each system for producing a speed signal responsive to the speed of the generator of that system, means in each system for deriving a current which is a function of the true load carried by the generator of the system, static means including a resistance network for differentially combining said derived currents of the respective systems to produce differential current which is a function of the deviation from a desired load division between the generators and for deriving from said differential current separate load division electric signals for each system, the load division signal for each system being a function of the degree and direction of deviation of the load carried by the generator from a desired proportion of the total load carried by all the generators, and means for applying to the slip control of each system the resultant of the speed and load division signals for the system.

9. A plurality of alternating current generator systems, each including a generator, a slip coupling with slip control responsive to electric signals, and an electric motor for driving the generator through the slip coupling, the generators being connected in parallel to supply a load, means in each system for deriving an electric speed signal which is a function of the generator speed, means in each system for deriving from the motor current a current which is a function of the load carried by the generator of the system, static means for differentially combining said derived currents of the respective systems to produce differential currents which are functions of the deviation from a desired load division between the generators and for deriving from said differential currents separate load division electric signals for each system, the load division signal for each system being a function of the degree and direction of deviation of the load carried by the generator from a desired proportion of the total load carried by all the generators, and means in each system including magnetic amplifier means for combining the speed signal of the system with the load division signal of the system to produce a resultant control signal for the slip control of the system.

10. A plurality of generator systems, each including a generator, a slip coupling having an electrically responsive slip control, and an electric motor for driving the generator through the slip coupling, said generators being connected in parallel to supply a load, means in each system for deriving from the motor current an electric current which is a function of the load on the generator of the system, a static network for differentially combining said derived currents of the respective systems and for deriving from said differential combination of derived currents, a separate load division electric signal for each system, the load division signal for any given system being a function of the deviation of the generator load of that system from a desired proportion of the total load carried by all the generators, and means for applying to the slip control of each system the load division signal for the system to regulate the input power to the generator of the system thereby to force a desired load division between the generators.

11. A plurality of alternating current generator systems, each including a generator, a controllable slip coupling, and motor means for driving the generator through the slip coupling, said generators being connected in parallel to supply a load, means in each system for deriving an electrical speed signal which is a function of the generator speed, means in each system for deriving an alternating current which is a function of the true load on the generator of the system, a rectifier in each system for rectifying said alternating current derived in the system, an impedance network connected to the outputs of said rectifiers for differentially combining said rectified derived currents of the respective systems and for deriving from said rectified derived currents a separate load division electric signal for each system, the load division signal for any given system being a function of the deviation of the generator load of that system from a desired proportion of the total load carried by all the generators, and magnetic amplifier means associated with each system for combining the speed signal of the system with the load division signal for the system to produce a resultant slip control force for the slip coupling of the system.

12. A plurality of alternating current generator systems, each including a generator, a controllable slip coupling, and an electric motor for driving the generator through the slip coupling, said generators being connected in parallel to supply a load, means in each system for deriving an electrical speed signal which is a function of the generator speed, said last means comprising a frequency sensitive detector coupled to the generator output, means in each system for deriving from the motor current an electric current which is a function of the load on the generator of the system, a static resistance network for differentially combining said derived currents of the respective systems and for deriving from said differentially combined currents a separate load division electric signal for each system, the load division signal for any given system being a function of the deviation of the generator load of that system from a desired proportion of the total load carried by all the generators, and means including magnetic amplifier means associated with each system for combining the speed signal of the system with the load division signal for the system to produce a resultant slip control force for the slip coupling of the system.

13. A plurality of alternating current generator systems, each including a generator, a controllable slip coupling, and motor means for driving the generator through the slip coupling, said generators being connected in parallel to supply a load, means in each system for deriving an electrical speed signal which is a function of the generator speed, means in each system for deriving an electric current which is a function of the true load on the generator of the system, a static impedance network for differentially combining said derived currents of the respective systems and for deriving from said differential combination of derived currents a separate load division electric signal for each system, the load division signal for any given system being a function of the deviation of the generator load of that system from a desired proportion of the total load carried by all generators, and means associated with each system for applying to the slip coupling of the systtem a slip control force derived from a combination of the load division signal for the system and the speed signal of the system.

14. A plurality of generators connected in parallel to supply a load, motor means for driving said generators, means associated with each generator for producing a load signal indicative of the load on the generator, static means for differentially combining the load signals of the respective generators and for producing from the combined load signals a load division signal which is a function of the deviation from a desired load division between the generators, and a slip coupling between at least one generator and the motor means, said slip coupling being controllable in response to said load division signal to force its associated generator to assume a desired proportion of the total load.

15. A plurality of generators connected in parallel to supply a load, motor means for driving said generators, means associated with each generator for producing a load signal indicative of the load on the generator, a static impedance network for differentially combining the load signals of the respective generators and for producing from the combined load signals a load division signal which is a function of the deviation from a desired load division between the generators, a slip coupling between at least one generator and the motor means, means for producing a speed signal responsive to the speed of said one generator, and means for controlling said slip coupling of said one generator in response to the resultant of said speed and load division signals.

16. A plurality of systems, each including a generator, a controllable slip coupling, and prime moving means for driving the generator through said slip coupling, said generators being connected in parallel to supply a load, and control means including a magnetic amplifier for applying to the slip coupling of each system a resultant control force having a load division component which is a function of the load division between the respective generators and a speed component which is a function of the generator speed in that system.

References Cited in the file of this patent

UNITED STATES PATENTS

| | | |
|---|---|---|
| 2,333,540 | Lynn | Nov. 2, 1943 |
| 2,419,462 | Petch et al. | Apr. 22, 1947 |
| 2,455,029 | Vogt | Nov. 30, 1948 |
| 2,469,706 | Winther | May 10, 1949 |

FOREIGN PATENTS

| | | |
|---|---|---|
| 557,921 | Great Britain | Dec. 10, 1943 |